United States Patent
Geisler et al.

(10) Patent No.: US 10,440,023 B2
(45) Date of Patent: Oct. 8, 2019

(54) AUTOMATIC CREATION OF GROUPS BASED ON A DEGREE OF COLLABORATION AMONG USERS

(71) Applicant: Dropbox, Inc., San Francisco, CA (US)

(72) Inventors: Roland Geisler, San Francisco, CA (US); Hamon Parvizi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 193 days.

(21) Appl. No.: 15/339,695

(22) Filed: Oct. 31, 2016

(65) Prior Publication Data

US 2018/0124129 A1    May 3, 2018

(51) Int. Cl.
| | |
|---|---|
| G06F 15/16 | (2006.01) |
| H04L 29/06 | (2006.01) |
| H04L 29/08 | (2006.01) |
| G06F 16/176 | (2019.01) |

(52) U.S. Cl.
CPC ............ H04L 63/10 (2013.01); G06F 16/176 (2019.01); H04L 63/104 (2013.01); H04L 63/20 (2013.01); H04L 67/06 (2013.01); H04L 67/22 (2013.01); H04L 67/306 (2013.01)

(58) Field of Classification Search
CPC . G06F 17/30165; H04L 63/10; H04L 65/403; H04L 67/06; H04L 67/22; H04L 67/306
See application file for complete search history.

(56) References Cited

U.S. PATENT DOCUMENTS

| | | | | |
|---|---|---|---|---|
| 9,390,450 | B1* | 7/2016 | Hart | G06Q 30/0643 |
| 2005/0080853 | A1* | 4/2005 | Kelley | G06F 17/30637 |
| | | | | 709/206 |
| 2012/0317135 | A1* | 12/2012 | Jin | G06F 17/30165 |
| | | | | 707/769 |
| 2014/0108562 | A1* | 4/2014 | Panzer | G06Q 10/10 |
| | | | | 709/206 |
| 2014/0181697 | A1* | 6/2014 | Kirigin | G06F 3/048 |
| | | | | 715/758 |
| 2014/0215568 | A1* | 7/2014 | Kirigin | G06F 21/00 |
| | | | | 726/4 |
| 2014/0244751 | A1* | 8/2014 | Tseng | H04N 21/26291 |
| | | | | 709/204 |
| 2014/0304254 | A1* | 10/2014 | Rubinstein | H04L 67/22 |
| | | | | 707/722 |

(Continued)

Primary Examiner — Tonia L Dollinger
Assistant Examiner — Dixon F Dabipi
(74) Attorney, Agent, or Firm — Fenwick & West LLP

(57) ABSTRACT

Users of a content management system (CMS) collaboratively work together to create, review, and edit the content items in the shared folder. The CMS provides a messaging service that allows the users to exchange messages and automatically recommends chat groups to users based on their shared folders and a level of collaboration determined for each content item in a shared folder. To determine collaboration, the CMS obtains user interactions performed by the users on content items in the shared folder and determines a collaboration value for the shared folder based on a function of weight frequencies of user interactions for each content item. If the collaboration value is greater than a threshold collaboration value, the CMS recommends that the user create a chat group with the users of the shared folder.

20 Claims, 7 Drawing Sheets

(56) References Cited

U.S. PATENT DOCUMENTS

2014/0304338 A1* 10/2014 Lee .................. H04L 67/22
                                                            709/205
2015/0347593 A1* 12/2015 Tsai ................ G06F 17/30867
                                                            707/722

* cited by examiner

AUTOMATIC CREATION OF GROUPS BASED ON A DEGREE OF COLLABORATION AMONG USERS

BACKGROUND

The described embodiments relate generally to improving document and content management systems that control access to shareable documents to provide collaboration among users, and particularly to determining a measure of collaboration among users and/or recommending collaboration groups to users to facilitate communication.

Online content management systems allow users to share content items from one client to another client. The client devices are computing devices that provide content items to a content management system for storage and synchronization with other client devices. Content management systems typically store content items for a variety of computer applications including for example word processing applications, spreadsheet applications, and presentation applications. When content items are added, deleted, or edited on a device, these modifications are sent to the content management system for storage and synchronization with other devices.

Content management systems also facilitate collaboration among users. Users may collaborate by using respective devices to separately view and edit a particular content item. For example, a user can share a folder or content item to allow one or more users to collaborate on the same content items and/or folders where the changes to the content items or folders are synced with other users who have been granted access rights to those content items and folders. Further, since group communication while collaborating is important, content management systems may also provide a chat or messaging service to allow users to directly communicate in chat groups while collaboratively editing, reviewing, or viewing content items.

Creating new groups for group communication or messaging has conventionally been a manual, time-consuming, and relatively labor-intense process. Conventionally, when creating a new group message, a user must manually search through their contacts or rely on auto fill. This often leads to inadvertently leaving individuals out of the message who should otherwise be a part of the communication, which tends to happen more as the number of users in the group gets larger. This can be particularly important in a business when it is critical that the right personnel are privy to the information being discussed or exchanged.

SUMMARY

A content management system (CMS) maintains content items, allows users to share content items with other users, and provides a messaging service to facilitate collaboration of the users collaboratively generating, reviewing, and/or editing content items. The CMS also allows users to share content folders of content items. A content folder includes one or more content items that become accessible to each user with whom a sharing user shares the content folder. Since access to the content folder is shared among the sharing user and the one or more users, sharing the content folder creates a shared folder, and the sharing user and the one or more users (collectively, "users") comprise a share group corresponding to their access to the shared folder.

Users of the CMS collaboratively work together to create, review, and edit the content items in the shared folder and it can often be advantageous for these users to be able to communicate as a group, such as a group chat or text message. Accordingly, the CMS is configured with a messaging service that enables the users to exchange messages, and is further configured to determine a level of collaboration between users with respect to shared folders and content items therein for each content item in a shared folder. The CMS is further configured to recommendation for new chat groups based on the determined measures of collaboration for the shared folders.

To determine a collaboration value for a shared folder, the CMS determines a collaboration value for each content item in the shared folder. The collaboration value for a shared folder is then determined as a function of the collaboration value for each content item therein, such as the average collaboration value.

The collaboration value for a content item is based on user interactions performed by the users with access to the shared folder. The user interactions, for example, include viewing or opening a content item, a number of views or times a user opens a content item in a given time period, an amount of time (e.g., average) spent editing or with a content item open per session, a distribution of engagement or total user interactions among the users (e.g., equal distribution vs. single-sided engagement), the relationship between users (e.g., same organization, leveling, geographical location, etc.), level of contribution (e.g., number of words added verses content item word total, number of files added, etc.), access rights (e.g., viewing, editing, admin, etc.), and so forth and each of these different interactions are defined as a different interaction type. Accordingly, the CMS determines a frequency or number or other measure of user interactions for each interaction type and applies a weight to measure each interaction type. The weight, in one embodiment, is empirically determined by the CMS based on an amount of collaboration a given interaction type suggests, such as a relatively high weight for an equal distribution of engagement among users and a relatively low weight for the relationship between users.

The CMS determines the collaboration measure for each content item based on combination or some other function of the frequency of user interactions weighted by the assigned weight for each interaction type. For a shared folder with multiple content items, a shared folder collaboration measure is determined that is a function of the collaboration measures of the individual content items in the shared folder (e.g., an average, sum, etc.).

The CMS determines a collaboration value for a plurality of shared folders. The shared folders may then be ranked according to their corresponding collaboration values. The CMS is configured to select a number of the highest ranked shared folders and recommend a corresponding chat group for each selected shared folder. Alternatively, the CMS can compare the collaboration value of a shared folder to a threshold value and, in response to the collaboration value being greater than the threshold value, the CMS can provide a recommendation to create a new chat group that includes the users that have access to the shared folder.

The determination of a collaboration value for shared folders and the recommendation for chat groups based on the collaboration values is particularly advantageous for users who share a large number of folders with disparate groups of individuals. By automatically recommending chat groups based on actual usage, the CMS reduces the burden on the user to determine which shared folders have sufficient usage to make a chat group beneficial. Automatic recommendation thus reduces the number of chat groups that are created unnecessarily (i.e. for shared folders that do not have sufficient usage), thereby reducing unnecessary consumption of resources.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment and System Architecture

Figure 1:
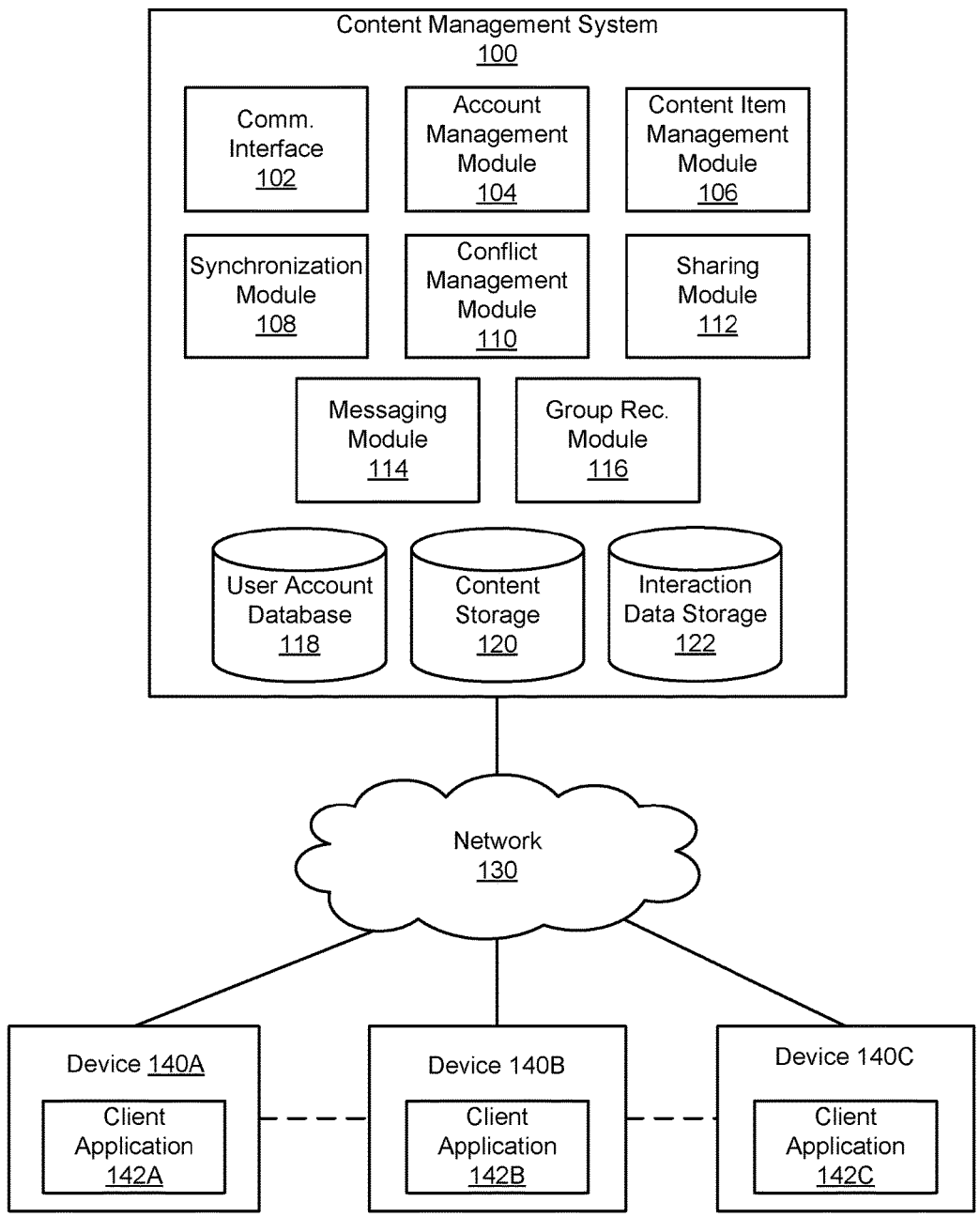
FIG. 1 shows an embodiment of an environment for content item synchronization and various modules and components of a content management system that facilitates collaboration.

FIG. 1 shows an example system environment that, in one embodiment, includes online content management system 100 ("CMS 100"), network 130, devices 140A, 140B, 140C (referred to generally as device 140), and client applications 142A, 142B, 142C (referred to generally as client application 142) that are associated with CMS 100. Although three devices are shown for purpose of illustration, any number of devices may be present in the environment in practice. Similarly, other modules or components described and illustrated throughout may include single or multiple instances as appropriate to the needs of the implementer and without loss of generality.

Each device 140 is configured by client application 142 to communicate with CMS 100 through network 130. Client application 142 extends the operation of device 140 beyond the functionality for a generic computer device and thereby improves the overall functionality of the device 140. The operation of device 140 and client application 142 in various embodiments is further described below. Network 130 is any suitable network and may include local networks, corporate networks, global networks, and any combination of these. In typical configurations, devices 140 communicate via a wired or wireless communication network to a local network service provider, and communicate with CMS 100 through the Internet.

CMS 100 provides content sharing and synchronization services for users of devices 140 to facilitate collaboration among users. These services allow users to share content with users of other devices 140, collaboratively generate and edit content items, exchanges messages (e.g., chat), and so forth. To facilitate collaboration, CMS 100 updates shared content responsive to changes and enables synchronized changes to content items across multiple devices 140 via client application 142. Users who register with CMS 100 are provided with a user account and a user may synchronize content across multiple devices 140 associated with the user's account, and the user may share content that is synchronized with devices associated with other users' accounts.

Content stored by CMS 100 can include any type of data, such as digital data, documents, media (e.g., images, photos, videos, audio, streaming content), data files and databases, source and object code, recordings, and any other type of data or file, collectively referred to here as "content items." Content items stored by CMS 100 may also be used to organize other content items, such as folders, tables, collections, albums, playlists, or in other database structures (e.g., object oriented, key/value etc.). In practice, various devices 140 will be synchronized with different groups of content items, based on user associations, permissions, content sharing permissions, and so forth. The operation of CMS 100 in various embodiments is further described below.

CMS 100, in one embodiment, includes communication interface 102, account management module 104, content item management module 106, synchronization module 108, conflict management module 110, sharing module 112, messaging module 114, group recommendation module 116, user account database 118, and content storage 120. Details about each component will be further described in a later section, however some elements are introduced here to provide context. Further, as is apparent to those of skill in the art, the operations and methods used for determining collaboration and/or automatically suggesting messaging groups to user in a synchronized content management system necessarily require a computer, and are not performed in any embodiment by mental steps by a human operator. Further, while the operations may make use of the facilitates of a computer to store and retrieve information, transmit and send information, or process information, those of skill in the art appreciate that such operations are not simply generic computer operations since they are herein performed in specific manners on specifically defined data using the algorithms described herein, and thus require configuration of a computer in a manner different from how such computers are provisioned natively by their operating system and standard applications alone. Additionally, the configuration disclosed provides enhanced data linking capabilities for applications opening content items on a content management system.

In one configuration, components described below with reference to CMS 100 may alternatively be incorporated into devices 140 that share and synchronize content items without management by CMS 100. These devices 140 may synchronize content and share interaction information over network 130 or via a direct connection as described above. For example, a user of client device 140A may designated certain content items to be shared with client device 140B, which for example, can be another computing device managed by the same user, or a computing device operated by a different user. In this configuration, devices 140 may incorporate any subset of the functionality of content item management module 106, synchronization module 108, conflict management module 110, sharing module 112, and other modules and data stores for incorporating functionality described below as provided by CMS 100. Accordingly, devices 140 in this configuration operate in a peer-to-peer configuration and may do so without CMS 100 or network 130.

To access the various content management system services, a user creates an account with CMS 100. CMS 100, in this example, maintains account information for registered users in user account database 118. User account database 118 can also include account management information, such as account type (e.g., free or paid), a user action log for each user (e.g., edit history, view history, etc.), maximum authorized storage space, storage space usage, content storage locations, security settings, personal configuration settings, content sharing data, and so forth. Account management module 104 can be configured to update and/or obtain user account details in user account database 118. Account management module 104 can be configured to interact with any number of other modules in CMS 100.

An account can be associated with multiple devices 140, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos, an audio folder that provides the ability to play back audio file content items and perform other audio related actions, or other special purpose folders. An account can also include shared folders or group folders that are linked with and available to multiple user accounts. The permissions for multiple users may be different for a shared folder. In another example, an account may correspond to a user profile for an employee of a company with an enterprise account operated by CMS 100. In one embodiment, the account is a namespace that may be associated with several users, each of whom may be associated with permissions to interact with the namespace. A namespace designates a directory (or "folder") in a directory structure into which the given content items are stored. To share content items, a user designates a namespace to be shared with other users and/or clients. CMS 100 then synchronizes the content items in the shared namespace(s) across client devices 140 associated with the shared namespace.

In some embodiments, CMS 100 includes content item management module 106 for maintaining a content directory that identifies the location of each content item in content storage 120, and allows client applications 142 to request access to content items in content storage 120. Content item management module 106 may also log user interactions with content items (e.g., views, edits, new versions, shares, etc.). A content entry in the content directory can also include a content pointer that identifies the location of the content item in content storage 120. For example, the content entry can include a content pointer designating the storage address of the content item in memory. In some embodiments, the content entry includes multiple content pointers that point to multiple locations, each of which contains a portion of the content item. In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

Content storage 120 can be a storage device, multiple storage devices, a server, and so forth. Alternatively, content storage 120 can be a cloud storage provider or network storage accessible via one or more communications networks. In one configuration, CMS 100 stores the content items in the same organizational structure as they appear on the device. However, CMS 100 can store the content items in its own order, arrangement, or hierarchy. In one embodiment, content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at CMS 100.

Content storage 120 can also store metadata describing content items, content item types, and the relationship of content items to various accounts, folders, or groups. The metadata for a content item can be stored as part of the content item or can be stored separately. In one embodiment, the metadata includes a blocklist that defines the blocks in the content item and an ordering of the blocks in the content item. In one configuration, each content item stored in content storage 120 is assigned a system-wide unique identifier.

Content storage 120 can decrease the amount of storage space required by identifying duplicate content items or duplicate blocks/segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 120 stores content items using a version control mechanism that tracks changes to content items, different versions of content items (such as a diverging version tree), and a change history. The change history includes a set of changes that, when applied to the original content item version, produces the changed content item version.

CMS 100 automatically synchronizes content items from devices 140, using synchronization module 108, which is one means for performing this function. The synchronization is platform-agnostic. That is, the content items are synchronized across multiple devices 140 of varying type, capabilities, operating systems, and so forth. For example, client application 142 synchronizes, via synchronization module 108 at CMS 100, content in the file system of device 140 with the content items in an associated user account in CMS 100. Client application 142 synchronizes any changes to content items in a designated folder and its sub-folders via synchronization module 108. Such changes include new, deleted, modified, copied, or moved files or folders. Synchronization module 108 also provides any changes to content associated with device 140 to client application 142. This synchronizes the local content at device 140 with the content items at CMS 100.

Conflict management module 110 determines whether there are any discrepancies between versions of a content item located on different devices 140, and is one means for performing this function. For example, when a content item is modified at one device and a second device, differing versions of the content item may exist at each device. Synchronization module 108 determines such versioning conflicts, for example by identifying the modification time of the content item modifications. Conflict management module 110 resolves the conflict between versions by any suitable means, such as by merging the versions, or by notifying a user of the later-submitted version.

A user can also view or manipulate content via a web interface of device 140. For example, the user can navigate in a web browser to a web address provided by CMS 100. Changes or updates to content in content storage 120 made through the web interface, such as uploading a new version of a file, are synchronized back to other devices 140 associated with the user's account. Multiple devices 140 may be associated with a single account and files in the account are synchronized between each of the multiple devices 140.

Communications interface 102 allows interfacing with various devices 140, and with other content and/or service providers via an Application Programming Interface (API), and is one means for performing this function. Certain software applications can gain access to content storage 120 via an API on behalf of a user. For example, a software package, such as an app on a smartphone or tablet computing device, can programmatically make calls directly to CMS 100, when a user provides credentials, to read, write, create, delete, share, or otherwise manipulate content. Similarly, the API can allow users to access all or part of content storage 120 through a web site.

Sharing module 112 allows user to share content publicly or privately, and is one means for performing this function. Sharing content publicly can include making the content item accessible from any computing device in network communication with CMS 100. Sharing content privately can include linking a content item in content storage 122 with two or more user accounts so that each user account has access to the content item or a folder of multiple content items.

To share a content item privately, in one embodiment, sharing module 112 adds a user account identifier to a content entry associated with the content item that grants the added user account access to the content item. Sharing module 112 can also be configured to remove user account identifiers from a content entry to restrict a user account's access to the content item.

To share content publicly, sharing module 112 generates a custom network address, such as a URL, which allows any web browser to access the content in CMS 100 without any authentication. Sharing module 112 includes content identification data in the generated URL, which can later be used by CMS 100 to properly identify and return the requested content item. For example, sharing module 112 can be configured to include the user account identifier and the content path in the generated URL. The content identification data included in the URL can be transmitted to CMS 100 by a device to access the content item. In addition to generating the URL, sharing module 112 can also be configured to record that a URL to the content item has been created. In some embodiments, the content entry associated with a content item can include a URL flag indicating whether a URL to the content item has been created.

Each time a user shares a content item with one or more users, in one embodiment, sharing module 112 generates a share group that includes the one or more users and maintains a list or other data structure of groups to which each user belongs in user account database 118. New groups can also be generated by users or organizations and users may join or subscribe to groups. User accounts of group members working within an organization, division of an organization, and so on can be associated with permissions to access a particular class or other designation of content items. In one embodiment, users with shared permissions are in a group associated with those permissions.

In one example, each employee of a company that uses CMS 100 as a content management system belongs to the general group of the company (e.g., Acme, Inc.). Additionally, the marketing department may have access to content items that the accounting department does not have access to and vice versa. Thus, user accounts of employees in the marketing department may additionally include permissions for marketing specific content items and user accounts of employees in the accounting department may additionally include permissions for accounting specific content items. Accordingly, each user can belong to many groups that are official, such as company, organizational, departmental, to casual, such as an after work happy hour group that includes users from different departments. In another example, if the marketing and sales departments collaborate on developing content for a pitch to a new client, a new group that includes members of the marketing and sales departments involved in the pitch is created.

Messaging module 116 provides a messaging or chat application that allows users of CMS 100 to communicate, and is one means for performing this function. Messaging module 116 provides communication between individual users, such as that provided by conventional text messaging or instant messaging applications; however, messaging module 116 also facilitates group communication based on share groups of a set of users with access to the same shared folder or content items.

Figure 2A:
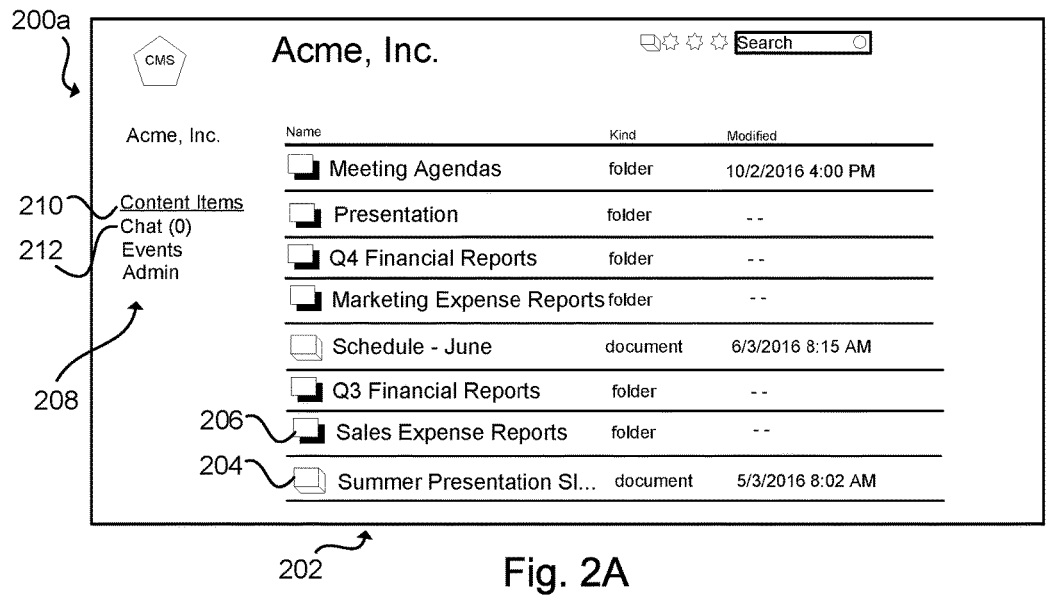
FIGS. 2A-2D illustrate a sequence of user interfaces wherein a user is recommended multiple new chat groups by a content management system, according to one embodiment.
Figure 2B:
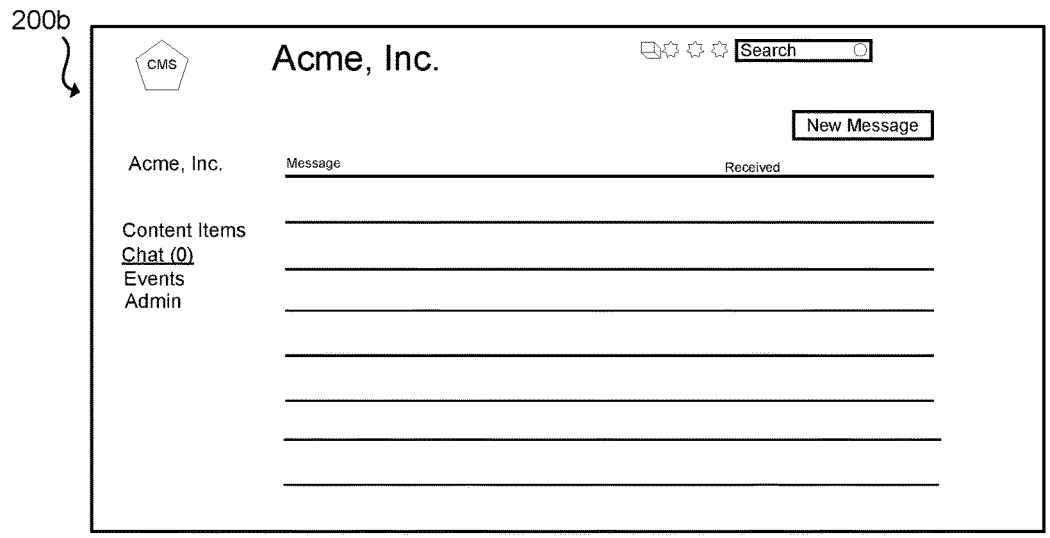
Figure 2C:
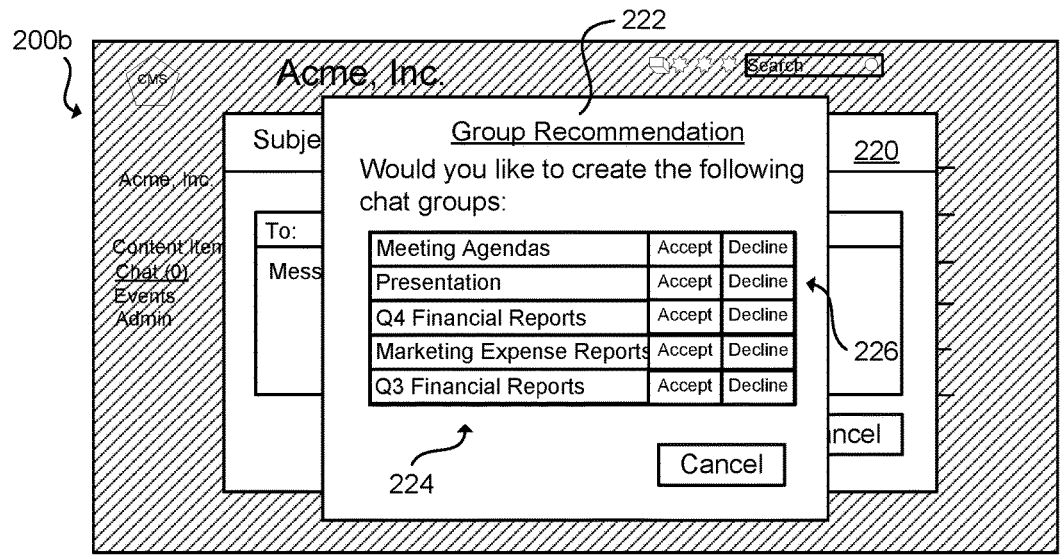

Group recommendation module 118 determines a collaboration value for shared folder and content items and automatically generates and recommends collaboration groups to users based on collaboration values, and is one means for performing these functions. a.
Providing Chat Group Recommendations FIGS. 2A-2C illustrate a sequence of user interfaces wherein a user is recommended multiple new chat groups by CMS 100, according to one embodiment. FIG. 2A shows account homepage 200*a* provided by CMS 100 as displayed on a client device. In this example, account homepage 200*a* is specific to the user and includes a list 202 of content items 204 and content folders 206 that the user has saved to their account with CMS 100. Account homepage 200*a* also includes a navigation column 208 that allows the user to select one of multiple links within navigation column 208 and be navigated to a location associated with the selected link. In this example, the links include content items link 210, that allows the user to navigate back to account homepage 200*a* to access their content items 204 and content folders 206, and chat link 212, that allows the user to communicate with other users via a messaging or chat service provided by CMS 100.

In this example, the user shares access to multiple content folders 206 with other users. These content folders 206 include for example Meeting Agendas folder, Presentation folder, Q4 Financial Reports folder, and so on. Since the user shares access to each of these folders with other users, the user and other users with access to each folder constitutes a shared group. In other words, each shared folder has a share group consisting of the set of users with whom the folder is shared. Thus, a given user may be a member of multiple different share groups, one for each shared folder to which the user has access. As discussed above, it can advantageous for these users to be able to communicate directly via a group chat or text message to discuss updates, developments, and provide feedback with respect to content items the users are collaboratively creating, editing, and so forth together.

Accordingly, FIG. 2B illustrates the result of the user selecting chat link 212 in FIG. 2B, whereby the user interface is updated to display chat inbox 200*b*. FIG. 2B shows an empty chat inbox 200b of a messaging service provided by CMS 100. In this example, the user is using the messaging service for the first time and, thus, has no existing conversations and is not a part of any chat groups. In one embodiment, in order to help the user become more integrated with the messaging service or simply to allow the user to create a chat group in order to send a group message regarding a content item, CMS 100 identifies share groups to which the user belongs, determines a level of collaboration among the users within each of those share groups, and recommends the creation of chat groups based on the determined level of collaboration (e.g., greater than a threshold collaboration value), which will be discussed in more detail below.

Figure 2D:
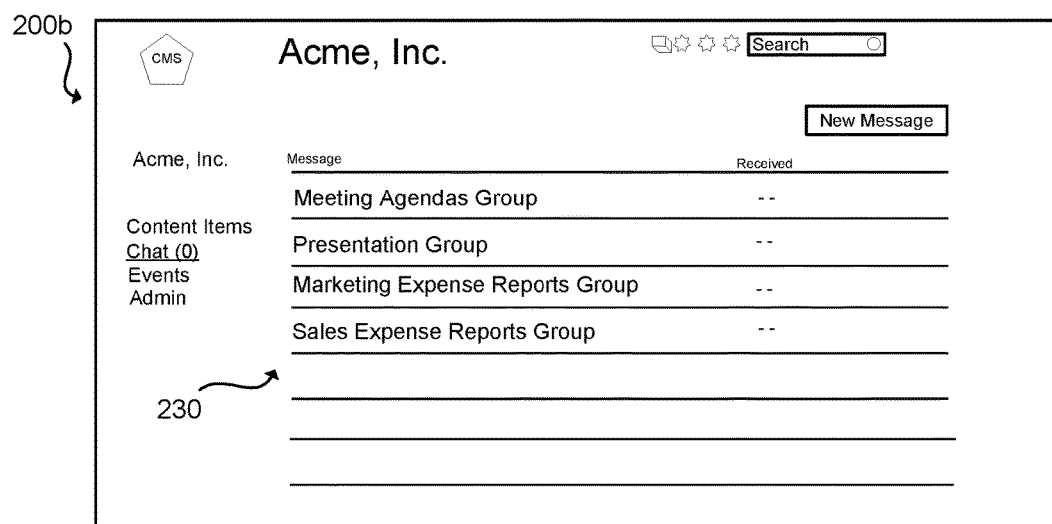

FIG. 2C shows group recommendation prompt 222 recommending multiple chat groups 224 to the user, in one embodiment. In this example, CMS 100 generates the recommendation prompt 222 in response to when the user creates a new message 220. Group recommendation prompt 222 includes a list of recommended chat groups 224 determined based on the collaboration values of users shared groups. In this example, group recommendation prompt 226 includes control elements 226 to allow the user to accept or decline creation of each chat group in the list of recommended groups 224. Here, not all of the user shared folders as shown in FIG. 2A have been recommended to the user based on their respective collaboration values. For example, the "Sales Expense Report" group associated with the Sales Expense Report folder 206 has not been selected for recommendation. Thus, the recommended chat groups can be a subset of the total number of shared groups for which the user is a member. FIG. 2D shows set 230 of chat groups 224 that the user has accepted to create, which is itself a subset of the recommended chat groups.

Figure 3A:
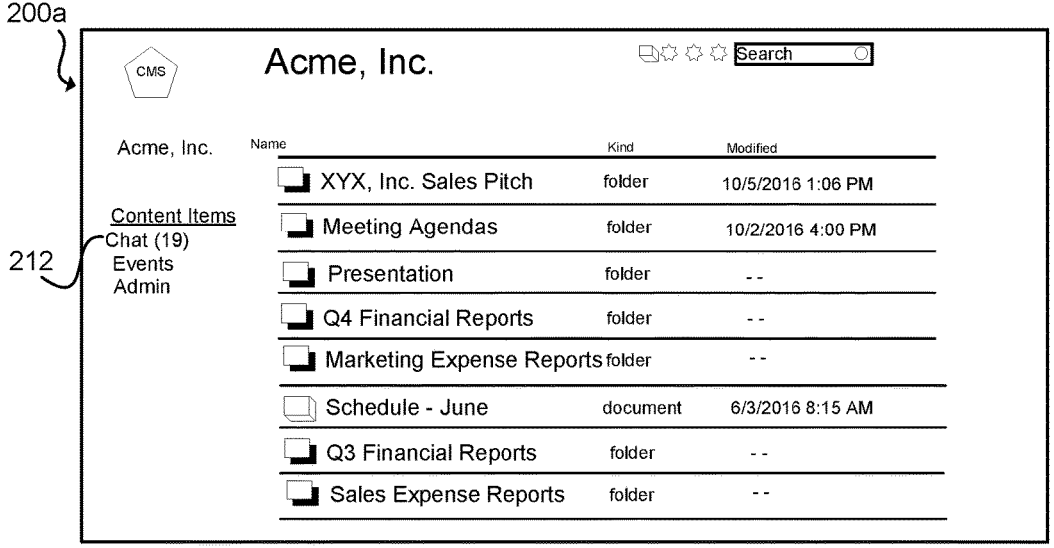
FIGS. 3A-3D illustrate a sequence of user interfaces wherein a user is recommended an individual new chat group by a content management system, according to one embodiment.
Figure 3B:
Figure 3C:
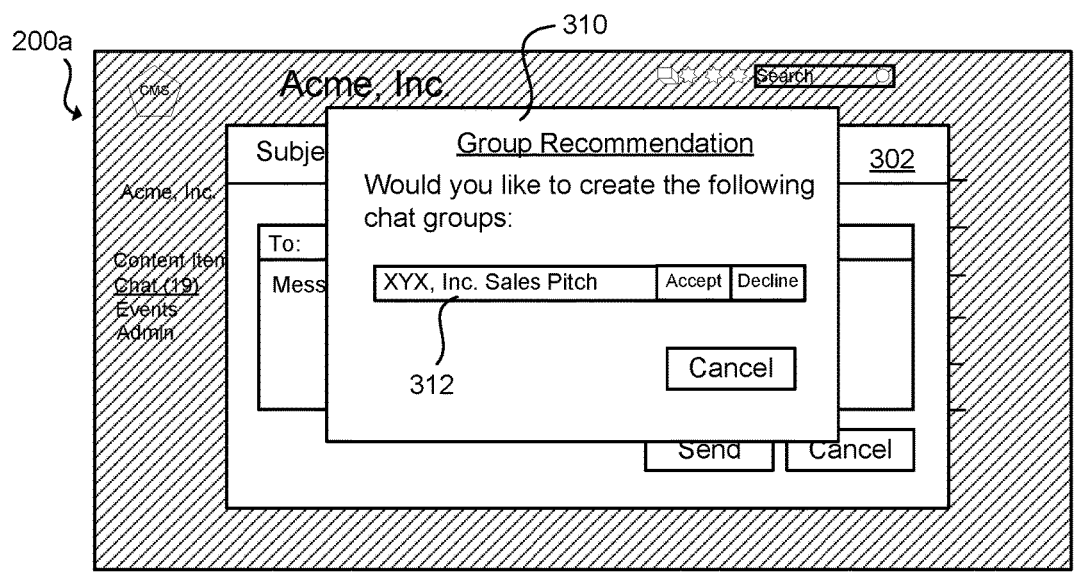
Figure 3D:
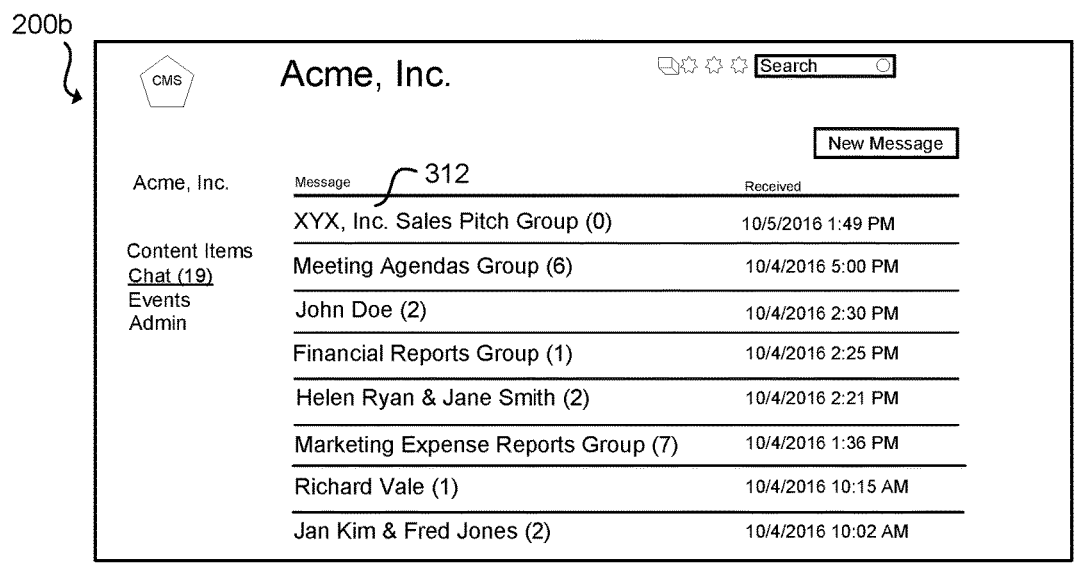

The above example is directed to the instance where a user is accessing or using the messaging service for the first time. FIGS. 3A-3C, however, illustrate a sequence of user interfaces wherein a user is recommended a new chat group by a content management system after using the messaging service for some time, according to one embodiment. FIG. 3A shows account homepage 200a sometime after the user has created shared folder 300 (i.e., "XYZ, Inc. Sales Pitch" folder) has been shared with other users, who have accessed the folder and the content items therein, including editing content items, adding new content items, or other types of interactions. Additionally, a number corresponding to the number of unread messages (19) the user has in inbox 200b is displayed adjacent chat link 212. FIG. 3B illustrates the chat inbox 200 displayed in response to the user selecting chat link 212. FIG. 3b shows chat inbox 200b with a list of the user's individual chats 304 and chat groups 306. In this example, the user selects the control element 308 to create a new message 308. In response thereto, the CMS 100 generates and displays group recommendation prompt 310 to create a new chat group 312 for the shared folder 300, based on the collaboration value for the shared folder. In response to the user selecting the control elements to accept the recommendation, new chat group 312 is subsequently displayed in the user's chat inbox 200b, as shown in FIG. 3D.

Process for Providing Chat Group Recommendations

Figure 4:
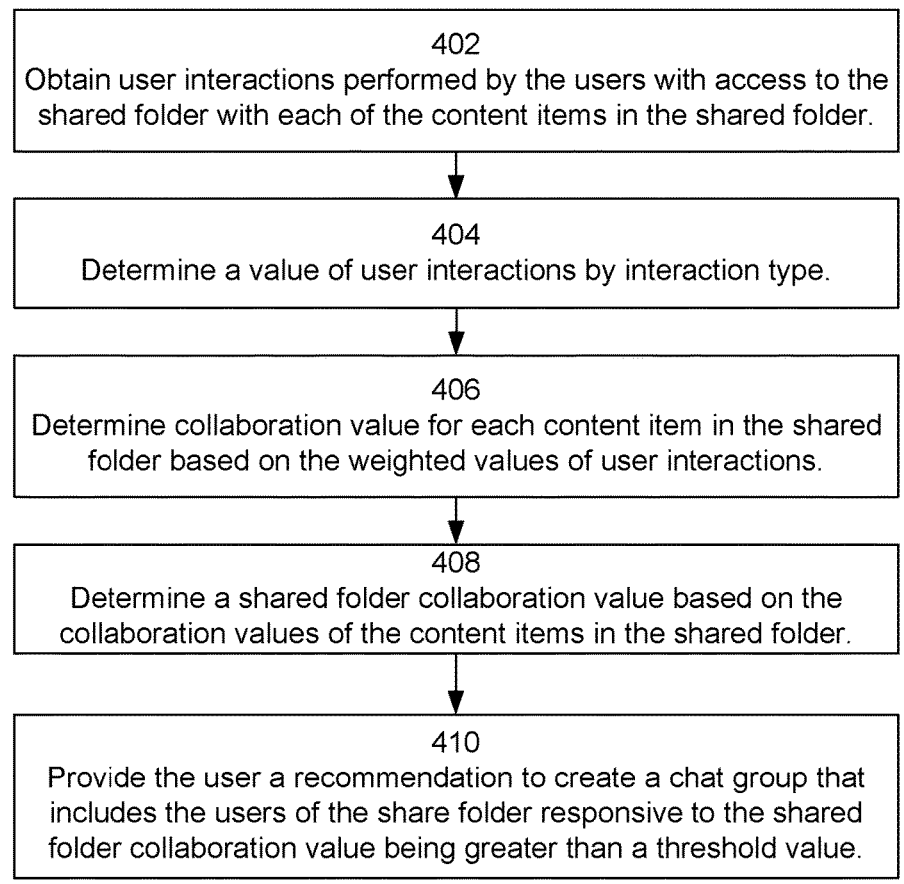
FIG. 4 shows a process for determining collaboration among users of a content management system and recommending chat groups based on the determined collaboration, according to one embodiment.

FIG. 4 shows an example of an algorithm for providing group chat recommendations to users based on a collaboration value, as performed by the recommendation module 116. Generally, the CMS 100 maintains content data for content items in content storage 120 that can be retrieved by users authorized to access the content item. For example, a user creates a shared folder and adds a first content item, a second content item, a third content item, and a fourth content item via one or more native application(s) 234 (e.g., a word processor, slide presentation program, spreadsheet, etc.) on device 140 and saves these content items in the content folder to their user account with CMS 100. For each shared folder and for each shared content item within the folders, the CMS 100 maintains interaction data for the respective shared content item, based on the interactions by members of the share group for the shared folder. This interaction data is used to compute the collaboration values for the shared content items and the shared folders, as further described below. The interaction data is held in an interaction data storage 122, which indexed by identifiers for the content items (and folders). Alternatively, the interaction data be stored and updated as metadata associated with each content item (and shared folder).

CMS 100 also provides a messaging service via messaging module 114 to facilitate collaboration of the users collaboratively generating, reviewing, and/or editing content items. Thus, users of CMS 100 collaboratively work together to create, review, and edit the content items in the shared folder and it is often advantageous for these users to communicate via messaging module 114 as a group, such as a group chat or text message to keep each other apprised of developments, progress, and so forth during the collaboration process. Accordingly, CMS 100 recommends chat groups to users based on their shared folders and a level of collaboration determined for each content item in a shared folder.

To determine a collaboration value for each shared folder, group recommendation module 116 determines a collaboration value for each content item in the shared folder based on the user interaction data. The group recommendation module 116 obtains 402 the user interaction data for interaction performed by the users with access to the shared folder with each of the content items in the shared folder from the interaction data storage 122.

Group recommendation module 116 may obtain the user interactions in response to a notification from content item management module 106 notifying group recommendation module 116 that the user has accessed the chat inbox via chat link 212. Alternatively, group recommendation module 116 may periodically request user interaction data from the interaction data storage 122. The user interaction data describes user interaction with content items, and may include one or more of following values.

number of times a content item has been opened since its creation;
  number of times a content item has been viewed since its creation;
  number of times a content item has been opened in a given time period,
  number of times a content item has been viewed in a given time period,
  number of different users who have opened or viewed the content item;
  number of different users who have edited the content item;
  percentage of all members of the shared group for the share folder containing the content item who have opened or accessed the content item
  amount of time (e.g., total or average) a content item was open per user session,
  amount of time (e.g., total or average) a content item was edited measure of user contribution to a content item (e.g., number of words added to a content per user, number of files added to a shared folder, etc.), a distribution of engagement or total user interactions among the users (e.g., equal distribution vs. single-sided engagement), the relationship between users (e.g., same organization, leveling, geographical location, etc.), access rights (e.g., viewing, editing, admin, etc.), and so forth and each of these different interactions are defined as a different interaction type.

Further, the different content types within a content item or folder can be leveraged to suggest collaboration groups (e.g., images vs tables) and content information for collaboration (e.g., recurring content items, such as weekly reports) can be used as confirmation of a group's importance. User feedback on suggested collaboration group can also influence subsequent recommendations. The user feedback can be global, such as based on all users of CMS 100, or the user feedback can be analyzed individually to learn an individual user's preferences.

With the obtained user interactions, group recommendation module 116 determines a collaboration value for a shared content item as a weighted linear combination of the values for the interaction data. The module 116 determines 404 a value (e.g., a frequency, number, etc.) for each interaction type and applies a weight (typically standardized in the range [0-1] associated with each interaction type to each value of the user interactions by interaction type. The weight, in one embodiment, is empirically determined based on an amount of collaboration a given interaction type suggests, as determined by a system administrator. For example, some interaction types indicating significant collaboration, such as the percentage of share group members who have viewed the content item may be given a relatively high weight for indicating a relatively equal distribution of engagement among the shared users. Further, group recommendation module 116 may normalize the values of the user interactions to the same scale prior to applying the weights. For example, if the values weren't normalized, some user interactions, such as the average time spent editing a content item, may heavily outweigh others, such as number of views within a time period.

For example, consider the following table for a single content item and a few user interactions:

| $I_n$ | User Interaction for content item $X_1$ | Number | Value | Weight | Weighted Value |
|---|---|---|---|---|---|
| $I_1$ | Number of views in a time period | 13 | 6 | 0.2 | 1.2 |
| $I_2$ | Average editing time | 65 min | 3 | 0.6 | 1.8 |
| $I_3$ | Distribution of user interactions | 0.91 | 9 | 0.8 | 7.2 |

In this example, the values have been normalized on the same scale in order for the average editing time $I_2$ (e.g., average of 65 mins over a week) to not heavily outweigh the number of views $I_1$ (e.g., 13 over the week). For example, different numbers, frequencies, counts, time, and so forth can be mapped to a value between 0 and 10 for each user interaction type; however, the weights could alternatively be adjusted to compensate for this discrepancy, such as weighting the average editing time heavier than the number of views.

Thus, in this example, the value of the user interactions ranges between 0 and 10 and the weight ranges from 0 to 1. A value of 10 corresponds to an empirically or heuristically determined high level of interaction associated with a user interaction. Thus, in this example, the average editing time $I_2$ for this content item is a 3, which is relatively low, and the distribution of user interactions $I_3$ is a 9, which is relatively high. The weight is also empirically or heuristically determined and, in this example, the distribution of user interactions $I_3$ has been identified as being a high indicator of user collaboration and, thus, has been assigned the relatively high weight of 0.8. Conversely, the number of views $I_1$ is not considered, in this example, to be the highest indicator of collaboration and has, thus, been assigned a relatively low weight of 0.2. Other value, weighting, and normalizing methods could alternatively be applied.

Accordingly, group recommendation module 116 determines 406 a collaboration value (e.g., a content item collaboration value, an individual collaboration value, etc.) for each content item based on linear combination of the weighted values of user interactions. For example, for content item $X_1$ above:

$$\text{CollabValue}(X_1) = \Sigma(v_i * w_i) \ i=1 \text{ to } 3 \qquad (1)$$

In one example, the CollabValue($X_n$) equals 10.2; however, other functions can be used, e.g. polynomial expressions.

The group recommendation module 116 then determines 408 the collaboration measure for the shared folder as a function of the collaboration measures of all content items in in the shared folder. For example, in one embodiment, the collaboration measure for a shared folder is the mean of the collaboration measures for the content items. Alternatively, the collaboration measure may be some other function, e.g., the total, mode, or other measure of central tendency. For example, the table below shows example content items $X_1$, $X_2$, $X_3$, $X_4$, and $X_5$ in the shared folder Folder$_1$ with corresponding collaboration values:

| Folder$_1$ | CollabValue($X_n$) |
|---|---|
| $X_1$ | 7.2 |
| $X_2$ | 9.3 |
| $X_3$ | 3.9 |
| $X_4$ | 5.7 |
| $X_5$ | 1.1 |

Accordingly, the shared folder collaboration value is a function of the CollabValue($X_1$), CollabValue($X_2$), CollabValue($X_3$), CollabValue($X_4$), and CollabValue($X_5$). In one example, the shared folder collaboration value for Folder is the average value:

$$\text{CollabValue}(\text{Folder}) = \Sigma \text{CollabValue}(X_i)/n \qquad (2)$$

In this example, CollabValue(Folder)=equals 5.44. Here, the shared folder collaboration value is the average of the collaboration values of the content items in the shared folder; however, the shared folder collaboration value could be the sum or some other function of the collaboration values of the content items in the shared folder.

To determine whether to recommend a chat group to a user, group recommendation module 116 compares the shared folder collaboration value for a given shared folder to a threshold collaboration value. The threshold value can be set by an administrator. If the shared folder collaboration value is greater than the threshold collaboration value, group recommendation module 116 provides 410 a notification or signal to messaging module 114 to provide the user with a recommendation to create a new chat group that includes the users that have access to the shared folder. If, however, the shared folder collaboration value is not greater than the threshold collaboration value, no action is taken. Thus, continuing with the example above, if the threshold value defined by group recommendation module 116 is 5.0, the shared folder collaboration value of 5.44, and thus a recommendation to create a new chat group that includes the users that have access to the shared folder is provided. Alternatively, if group recommendation module 116 has set the threshold collaboration value higher than 5.44, no action regarding a chat group recommendation would be taken, in this example.

Alternatively, the threshold value may correspond to a number of a user's top or most collaborative shared groups and, instead of being used to filter the share groups for chat group recommendation, the shared folder collaboration value is used to rank the user's share groups, and the threshold value determines how many of the topped ranked share groups are recommended to the user as chat groups.

Client Device and Client Application

Figure 5:
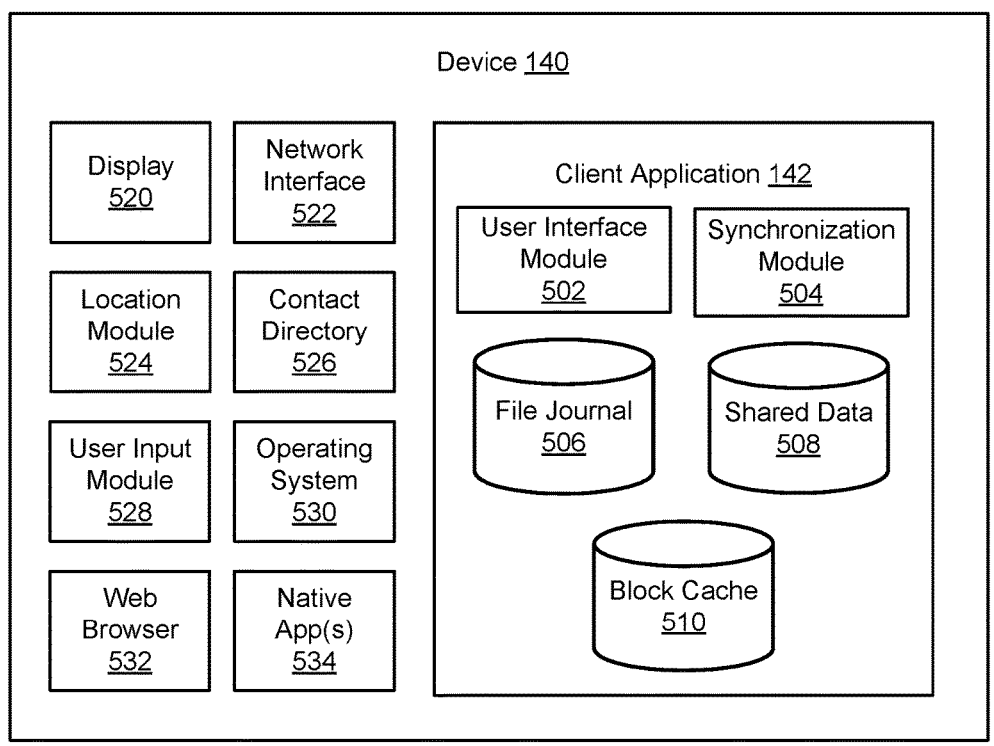
FIG. 5 shows various modules and components of a client device that communicates with a content management system to facilitate content item synchronization and user collaboration, according to one embodiment.

FIG. 5 shows exemplary modules and components of device 140 in accordance with one embodiment. Device 140 includes display 520 for providing information to the user, and in certain client devices 140 includes a touchscreen. Device 140 also includes network interface 522 for communicating with CMS 100 via network 130. Device 140 also includes a user input module 528, which receives user inputs from various user input devices, such as a keyboard, a mouse, a track pad, or other device. Other conventional components of a client device 140 that are not material are not shown, for example one or more computer processors, local fixed memory (RAM and ROM), as well as optionally removable memory (e.g., SD-card), power sources, and audio-video outputs.

Software modules include operating system 230 and one or more native applications 534. Native applications 534 vary based on client device, and may include various applications for creating, viewing, consuming, and modifying content stored on CMS 100, such as word processors, spreadsheets, database management systems, code editors, image and video editors, e-book readers, audio and video players, and the like. Operating system 534 on each device provides a local file management system and executes the various software modules such as content management system client application 142 and native application 534. A contact directory 526 stores information about the user's contacts, such as name, picture, telephone numbers, company, email addresses, physical address, website URLs, and the like. Further operation of native applications 534, operating system 530, and client application 142 are described below.

In certain embodiments, device 140 includes additional components such as camera and location module 524. The camera may be used to capture images or video for upload to the online CMS 100. Location module 524 determines the location of device 140, using for example a global positioning satellite signal, cellular tower triangulation, or other methods. Location module 524 may be used by client application 142 to obtain location data and add the location data to metadata about a content item, such as an image captured by the camera.

Client device 140 accesses CMS 100 in a variety of ways. Client application 142 can be a dedicated application or module that provides access to the services of CMS 100, providing both user access to shared files through a user interface, as well as programmatic access for other applications. Client device 140 may also access CMS 100 through web browser 532 by signing into a user account through a content management system webpage. As an alternative, client application 142 may integrate access to CMS 100 with the local file management system provided by operating system 530. When access to CMS 100 is integrated in the local file management system, a file organization scheme maintained at CMS 100 is represented as a local file structure by operating system 530 in conjunction with client application 142. Client application 142 may take various forms, such as a stand-alone application, an application plug-in, a browser extension, and so forth. Client application 142 includes various modules and data stores for synchronizing data with CMS 100. Client application 142 includes user interface module 502 and synchronization module 504, and maintains data stores including file journal 506, shared data 508, and block cache 510. The various modules and data stores are described separately throughout this disclosure for convenience and in various implementations may be combined or further divided into separate components as desired. The client application 142 generally, and the various modules specifically, are not conventional or routine elements of generic computing device 140.

Accordingly, device 140 receives content items from CMS 100, stores such items to local content data store 208, where they may be accessed and edited with various native applications 255 stored on the device 140. For example, device 140 may include a photo editing application that manipulates image content items, a word processing application that permits modification of text content items, or a computer-aided design (CAD) application that permits modification of drawing content items. Additionally, CMS 100 can share a content item with other users upon user request and provide users with read and write access.

Shared data 508 are data that has been synchronized with CMS 100, and includes content items received from CMS 100. When users add, modify, or delete content items in shared data 508, those changes are synchronized with CMS 100. Synchronization module 504 and block cache 510 work to identify blocks that comprise content items being uploaded to CMS 100 and synchronization module 504 assigns a block identifier by performing any suitable hashing algorithm, such as MD5 or SHA-1. Synchronization module 504 then uses these identifiers to compare the resident blocks located in the block cache 510 with the blocks maintained by CMS 100. One example of such synchronization is provided in U.S. Pat. Pub. US20150012488 filed Sep. 27, 2014 and is hereby incorporated by reference in its entirety.

Within client application 142, file journal 506 stores a table listing metadata for all content items accessible to the account using the client application 142. Metadata includes revision date and time, namespace, and blocklists corresponding to each content item. Content items that are not resident or not synchronized are still included in the file journal 506.

When data is modified or added to shared data 508 on client device 140 within client application 142, the modifications to shared data 508 are transmitted to CMS 100 by synchronization module 504. The uploaded data includes the relevant block identifier for the modified or added blocks. CMS 100 then notifies other client devices 140 that have the same namespace as the uploading client device 100 that new blocks, or new versions of blocks, have been uploaded. The notification may include the block identifiers and the corresponding content items to be updated. When the client device 140 receives a notification, client device 140 queries CMS 100 for modifications to shared data 508. When the shared data is modified, the synchronization module 504 requests the modifications from CMS 100 to store shared data on client device 140. The request may be a single request that includes a block list for the new or updated content items or multiple requests may be sent each, including a single block for download to client device 140. Synchronization module 504 then receives any blocks downloaded from CMS 100 by updating file journal 506, shared data 508, and block cache 510, to reflect the new versions of the downloaded blocks.

User interface module 502 provides a user with an interface to view and access content items associated with their user account from CMS 100. User interface module 502 also allows the user to access a messaging service provided by CMS 100 that includes a chat or messaging interface where the user may exchange messages with other users and be recommended chat groups based on their shared folders.

Although described within the context of a content management system that synchronizes and updates information across content items and applications, the computer-implemented methods of improving collaboration among user including determining collaboration among users and/or recommending collaboration groups to users can be implemented within other systems (e.g., an enterprise system, a social networking system, etc.) with suitable user-interaction input signals capable of determining a degree of collaboration among user within or outside of the system.

SUMMARY

Content management system (CMS) 100 may be implemented using a single computer, or a network of computers, including cloud-based computer implementations. For the purposes of this disclosure, a computer is a device having one or more processors, memory, storage devices, and networking resources. The computers are preferably server class computers including one or more high-performance CPUs and 1 G or more of main memory, as well as 500 GB to 2 Tb of computer readable, persistent storage, and running an operating system such as LINUX or variants thereof. The operations of CMS 100 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of CMS 100 are sufficiently complex as to require implementation on a computer system, and cannot be performed in the human mind simply by mental steps.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented by a combination of hardware and software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
maintaining, by an online content management system (CMS), a plurality of shared folders, each shared folder including one or more content items that are accessible by two or more user accounts that have been granted access to the shared folder;
maintaining, by the CMS, a messaging service enabling users with a user account at the CMS to exchange messages;
determining, for each shared folder, a collaboration value for the shared folder that quantifies an amount of user collaboration for the shared folder, the collaboration value being determined by:
  obtaining user interactions associated with each of the one or more content items in the shared folder made by users of the two or more user accounts, each user interaction having an interaction type of a plurality of interaction types and each interaction type being assigned a weight;
  determining, for each of the one or more content items, a value of the user interactions by each of the plurality of interaction types;
  generating, for each of the one or more content items, a set of weighted values of the user interactions by applying the assigned weight to the values of the user interactions for each of the plurality of interaction types;
  determining a collaboration value for each of the one or more content items based on the set of weighted values of the user interactions;
  determining the collaboration value for the shared folder based on the collaboration values of the one or more content items in the shared folder; and
determining whether at least one shared folder of the plurality of shared folders has a collaboration value greater than a threshold value; and
responsive to determining that at least one shared folder has a collaboration value greater than the threshold value, providing, by the CMS, a recommendation to a computing device authorized to access a user account to create at least one chat group that includes the one or more user accounts of the identified at least one shared folder, each chat group allowing the one or more user accounts of the shared folder to exchange messages via the messaging service provided by the CMS.

2. The method of claim 1, further comprising:
receiving, by the CMS, a request from the computing device to share a content folder with the one or more user accounts, the content folder including the one or more content items, wherein sharing the content item with the one or more user accounts allows each of the one or more user accounts to at least access the one or more content items in the content folder; and
responsive to the request, providing, by the CMS, the one or more user accounts access to the one or more content items in the content folder, the one or more user accounts being associated with a share folder of the plurality of share folders corresponding to the content folder based on the access to the one or more content items in the content folder.

3. The method of claim 1, wherein the shared folder collaboration value for the shared folder is an average of collaboration values of the one or more content items in the shared folder.

4. The method of claim 1, further comprising:
determining, for each content item, a distribution of the user interactions among the users granted access to the share folder, the collaboration value for each content item is further based at least in part on the distribution of the user interactions.

5. The method of claim 4, wherein a higher distribution of the user interactions corresponds to a higher collaboration value relative to a lower distribution of the user interactions for a content item.

6. The method of claim 1, wherein the collaboration value measures an amount of collaboration on each of the one or more content items among users granted access to the shared folder, and
wherein the user interactions are performed by the one or more user accounts and the user account.

7. The method of claim 6, wherein the user interactions include at least one from the group consisting of: viewing or opening a content item, a frequency or number of views in a defined time period, an amount of time a user spends editing or viewing a content item per session, a volume of edits or changes made to a content item, user responses to the provided recommendation to create the at least one chat group, or any combination thereof.

8. The method of claim 7, wherein each of 1) viewing or opening a content item, 2) a frequency or number of views in a defined time period, 3) an amount of time a user spends editing or viewing a content item per session, 4) a volume of edits or changes made to a content item, and 5) user responses to the provided recommendation to create the at least one chat group each correspond to a different interaction type of the plurality of interaction types.

9. A computer-implemented method comprising:
obtaining, by an online content management system (CMS), user interactions performed by a plurality of users in association with a plurality of content items in a shared folder, each user interaction is associated with one of a plurality of interaction types and each interaction type is assigned a weight, each of the plurality of users having been granted access to the plurality of content items of the shared folder;
determining, for each content item, a value of user interactions segmented by interaction type;
applying a weight to each interaction type to the value of user interactions segmented by interaction type;
determining a collaboration value for the shared folder that quantifies an amount of user collaboration for the shared folder based on weighted frequencies of the user interactions for each content item in the shared folder; and
presenting a prompt on a computing device for display to a user prompting the user to create a chat group that includes the plurality of users granted access to the plurality of content items of the shared folder in response to the collaboration value being greater than a threshold value.

10. The method of claim 9, further comprising:
receiving a request to the prompt from the user to create the chat group; and
generating, by a messaging service provided by the CMS, the chat group, the chat group allowing the user to initiate a chat message conversation with the plurality of users granted access to the plurality of content items of the shared folder.

11. The method of claim 9, further comprising:
determining, for each content item, a distribution of the user interactions among the users granted access to the share folder, the collaboration value for each content item further being based at least in part on the distribution of the user interactions, and
wherein a higher distribution of the user interactions corresponds to a higher collaboration value relative to a lower distribution of the user interactions for a content item.

12. The method of claim 9, wherein the collaboration value for the shared folder based on the weighted frequencies of the user interactions for each content item in the shared folder is determined by:
determining, for each content item in the shared folder, an individual collaboration value for each of the one or more content items based on the weighted frequencies of the user interactions for each content item; and
determining the collaboration value for the shared folder by summing or averaging each of the individual collaboration values of the content items.

13. The method of claim 12, wherein the weight associated each interaction type is assigned to the interaction types by the CMS based on an empirically determined amount of collaboration associated with each interaction type, at least one of the interaction types being different relative to at least one other interaction type.

14. The method of claim 13, wherein the user interactions include at least one from the group consisting of: viewing or opening a content item, a frequency or number of views in a defined time period, an amount of time a user spends editing or viewing a content item per session, a volume of edits or changes made to a content item, user responses to the provided prompt to create the chat group, or any combination thereof, and
wherein each of 1) viewing or opening a content item, 2) a frequency or number of views in a defined time period, 3) an amount of time a user spends editing or viewing a content item per session, 4) a volume of edits or changes made to a content item, and 5) user responses to the provided prompt to create the chat group each correspond to a different interaction.

15. A non-transitory computer-readable storage medium storing instructions that, when executed by at least one processor, cause a computing device of an online content management system to:

obtain user interactions performed by a plurality of users in association with a plurality of content items in a shared folder, each user interaction is associated with one of a plurality of interaction types and each interaction type is assigned a weight, each of the plurality of users having been granted access to the plurality of content items of the shared folder;

segment, for each content item in the shared folder, the user interactions by interaction type to generate a plurality of sets of user interactions, each set of user interactions corresponding to a different interaction type, each interaction type being associated with a weight corresponding a level or collaboration associated with the interaction type;

determine, for each set of user interactions for each content item in the shared folder, a value of user interactions;

apply the weight associated with each interaction type to the determined value of each set of user interactions to generate a set of weighted frequencies of user interactions;

determine a collaboration value for the shared folder that quantifies an amount of user collaboration for the shared folder based on the set of weighted frequencies of user interactions for each content item in the shared folder; and display, in response to the collaboration value being greater than a threshold value, a prompt on a display screen of the computing device prompting a user to create a chat group that includes the plurality of users granted access to the plurality of content items of the shared folder.

16. The non-transitory computer-readable storage medium of claim 15, wherein the instructions, when executed by the at least one processor, further cause the computing device of the online content management system to:

receive a request from the user to share a content folder with the plurality of users, the content folder including the plurality of content items, wherein sharing the content folder with the plurality of users allows each of the plurality users to at least access the plurality of content items in the content folder; and provide the plurality of users access to the plurality of content items in the content folder, the plurality of users being associated with the share folder corresponding to the content folder based on the access to the plurality of content items in the content folder in response to the user sharing the content folder with the plurality of users.

17. The non-transitory computer-readable storage medium of claim 15, wherein the prompt provides the user with an option that allows the user to accept creation of the chat group or decline creation of the chat group.

18. The non-transitory computer-readable storage medium of claim 15, wherein the instructions, when executed by the at least one processor, further cause the computing device of the online content management system to:

determine, for each content item, a distribution of the user interactions among the plurality of users, the collaboration value for each content item further being based at least in part on the distribution of the user interactions, and wherein a higher distribution of the user interactions corresponds to a higher collaboration value relative to a lower distribution of the user interactions for a content item of the plurality of content items.

19. The non-transitory computer-readable storage medium of claim 15, wherein the collaboration value for the shared folder based on the set of weighted frequencies of the user interactions for each content item in the shared folder is determined by:

determining, for each content item in the shared folder, an individual collaboration value for each of the plurality of content items based on the weighted frequencies of the user interactions for each content item; and determining the collaboration value for the shared folder by summing or averaging each of the individual collaboration values of the content items.

20. The non-transitory computer-readable storage medium of claim 15, wherein the user interactions include at least one from the group consisting of: viewing or opening a content item, a frequency or number of views in a defined time period, an amount of time a user spends editing or viewing a content item per session, a volume of edits or changes made to a content item, user responses to the provided prompt to create the chat group, or any combination thereof, wherein each of 1) viewing or opening a content item, 2) a frequency or number of views in a defined time period, 3) an amount of time a user spends editing or viewing a content item per session, 4) a volume of edits or changes made to a content item, and 5) user responses to the provided prompt to create the chat group each correspond to a different interaction, and wherein the weight associated each interaction type is assigned to the interaction types by the online content management system based on an empirically determined amount of collaboration associated with each interaction type, at least one of the interaction types being different relative to at least one other interaction type.

* * * * *

UNITED STATES PATENT AND TRADEMARK OFFICE
CERTIFICATE OF CORRECTION

PATENT NO. : 10,440,023 B2
APPLICATION NO. : 15/339695
DATED : October 8, 2019
INVENTOR(S) : Roland Geisler and Hamon Parvizi Page 1 of 1

It is certified that error appears in the above-identified patent and that said Letters Patent is hereby corrected as shown below:

In the Claims

Claim 15, Column 19, Line 13, delete "weight corresponding a" and insert --weight corresponding to a--.

Claim 16, Column 19, Line 42, delete "the plurality users" and insert --the plurality of users--.

Signed and Sealed this
Seventeenth Day of December, 2019

Andrei Iancu
*Director of the United States Patent and Trademark Office*